US012705430B1

(12) United States Patent
Chandrasekaran et al.

(10) Patent No.: US 12,705,430 B1
(45) Date of Patent: Aug. 11, 2026

(54) INTELLIGENT PROCESS AUTOMATION FOR OMNICHANNEL USER INTERACTION

(71) Applicant: NTT DATA Services, LLC, Plano, TX (US)

(72) Inventors: Sankar Chandrasekaran, Chennai (IN); Ujjwal Sharma, Chennai (IN); Dhurai Ganesan, Chennai (IN); Harsh Vinayak, Gurgaon (IN); Tanvir Khan, Allen, TX (US); Jeyarani Rajadurai, Chennai (IN)

(73) Assignee: NTT Data Services, LLC, Plano, TX (US)

(*) Notice: Subject to any disclaimer, the term of this patent is extended or adjusted under 35 U.S.C. 154(b) by 426 days.

(21) Appl. No.: 17/503,030

(22) Filed: Oct. 15, 2021

(51) Int. Cl.
*G06F 40/35* (2020.01)
*G06F 40/20* (2020.01)
*G10L 15/22* (2006.01)
*G10L 15/26* (2006.01)

(52) U.S. Cl.
CPC .............. *G06F 40/35* (2020.01); *G06F 40/20* (2020.01); *G10L 15/22* (2013.01); *G10L 15/26* (2013.01)

(58) Field of Classification Search
CPC ......... G06F 40/35; G06F 40/20; G10L 15/22; G10L 15/26
USPC .......................................................... 704/235
See application file for complete search history.

(56) References Cited

U.S. PATENT DOCUMENTS 8,781,105 B1 7/2014 Duva et al.
10,346,621 B2 7/2019 AthuluruTIrumala et al.
10,635,695 B2 4/2020 Seth et al.
10,659,601 B2 5/2020 Kulkarni et al.
10,812,655 B1 * 10/2020 Adibi ...................... G10L 15/22
11,115,528 B1 * 9/2021 Rao ....................... H04M 3/527
2010/0114575 A1 * 5/2010 Itoh ....................... G06F 16/685 704/E15.001
2017/0352041 A1 12/2017 Ramamurthy et al.
(Continued)

OTHER PUBLICATIONS

Ghosh, S., Ness, S., & Salunkhe, S. (2024). The role of AI enabled chatbots in omnichannel customer service. Journal of Engineering Research and Reports, 26(6), 327-345. (Year: 2024).*
(Continued)

*Primary Examiner* — Richemond Dorvil
*Assistant Examiner* — Rodrigo A Chavez
(74) *Attorney, Agent, or Firm* — Patterson + Sheridan, LLP

(57) ABSTRACT

In one general aspect, in an embodiment, a method of intelligent process automation includes discovering a support communication via a communication data source that provides voice and non-voice communication service, the support communication corresponding to a support request of a user. The method also includes obtaining communication text from the support communication based, at least in part, on a determination of whether the support communication is a voice communication or a non-voice communication. The method also includes automatically resolving the communication text to a support use case. The method also includes automatically selecting a support actor for the support request based, at least in part, on the support use case, where the support actor is selected from a plurality of support actors that include a plurality of support bots. The method also includes triggering handling of the support request by the selected support actor.

18 Claims, 7 Drawing Sheets

(56) References Cited

U.S. PATENT DOCUMENTS

| | | | | |
|---|---|---|---|---|
| 2018/0054524 | A1* | 2/2018 | Dahan | H04M 3/5231 |
| 2018/0096322 | A1* | 4/2018 | D'Agostino | G06F 16/2425 |
| 2019/0042988 | A1* | 2/2019 | Brown | G06F 16/9535 |
| 2020/0211571 | A1* | 7/2020 | Shoa | G10L 17/22 |
| 2020/0329144 | A1* | 10/2020 | Morgan | G06F 40/30 |
| 2020/0342462 | A1 | 10/2020 | Todd et al. | |
| 2021/0144107 | A1* | 5/2021 | Liang | G06N 5/04 |
| 2021/0201359 | A1* | 7/2021 | Sekar | G06N 3/084 |
| 2021/0304074 | A1* | 9/2021 | Zaremoodi | G06N 3/006 |
| 2021/0342542 | A1* | 11/2021 | James | G06N 5/02 |
| 2022/0092056 | A1* | 3/2022 | Sekar | G06Q 10/10 |

OTHER PUBLICATIONS

Chaudhry, Sanyog and Danami, Mehul, "Integrated Customer Experience (CX) transformation" Web page <https://www.wipro.com/business-process/integrated-customer-experience-cx-transformation/>, Sep. 2019.

Cyara, "Cyara Automated CX Assurance Platform" Web page <https://cyara.com/platform/>, Sep. 8, 2021.

Genesys, "Intelligent Voice Assistant Improve Marketing, Sales and Customer Service" Web page <https://www.genesys.com/en-sg/capabilities/voicebots>, Jul. 15, 2021.

* cited by examiner

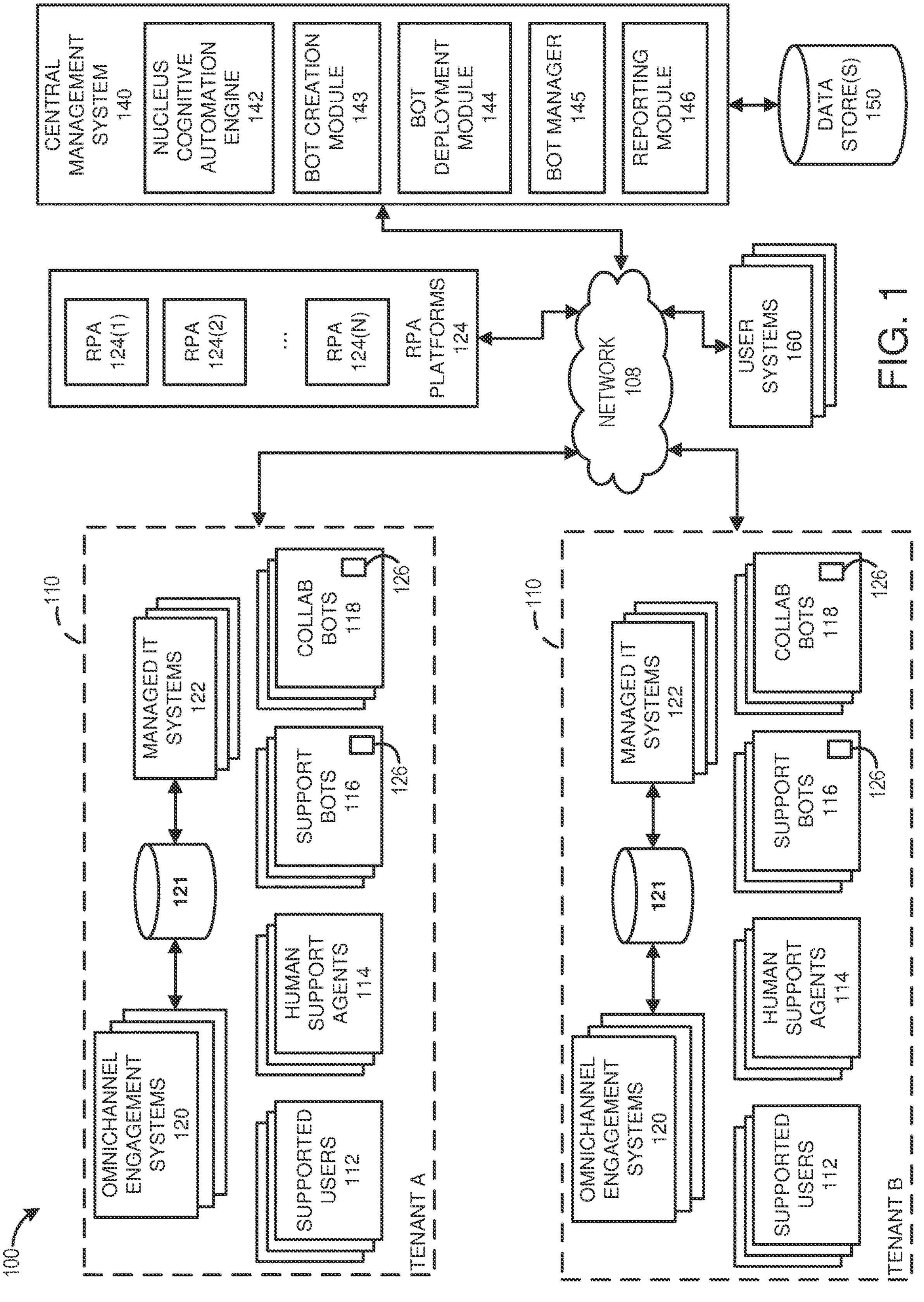
CENTRAL MANAGEMENT SYSTEM 140
NUCLEUS COGNITIVE AUTOMATION ENGINE 142
BOT CREATION MODULE 143
BOT DEPLOYMENT MODULE 144
BOT MANAGER 145
REPORTING MODULE 146
DATA STORE(S) 150
RPA 124(1)
RPA 124(2)
...
RPA 124(N)
RPA PLATFORMS 124
NETWORK 108
USER SYSTEMS 160
FIG. 1
100
110
OMNICHANNEL ENGAGEMENT SYSTEMS 120
121
MANAGED IT SYSTEMS 122
SUPPORTED USERS 112
HUMAN SUPPORT AGENTS 114
SUPPORT BOTS 116
COLLAB BOTS 118
126
126
TENANT A
110
OMNICHANNEL ENGAGEMENT SYSTEMS 120
121
MANAGED IT SYSTEMS 122
SUPPORTED USERS 112
HUMAN SUPPORT AGENTS 114
SUPPORT BOTS 116
COLLAB BOTS 118
126
126
TENANT B

INTELLIGENT PROCESS AUTOMATION FOR OMNICHANNEL USER INTERACTION

BACKGROUND

Technical Field

The present disclosure relates generally to robotic processes and more particularly, but not by way of limitation, to intelligent process automation for omnichannel user interaction.

History of Related Art

Task automation, while often desirable, is not always feasible. Particularly in the realm of technical support, extensive human intervention is usually necessary. Automation, if any, is usually overly simplistic and ineffective.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, in an embodiment, a method of intelligent process automation includes discovering a support communication via a communication data source that provides voice and non-voice communication service, the support communication corresponding to a support request of a user. The method also includes obtaining communication text from the support communication based, at least in part, on a determination of whether the support communication is a voice communication or a non-voice communication. The method also includes automatically resolving the communication text to a support use case. The method also includes automatically selecting a support actor for the support request based, at least in part, on the support use case, where the support actor is selected from a plurality of support actors that include a plurality of support bots. The method also includes triggering handling of the support request by the selected support actor. Other embodiments of this aspect include corresponding computer systems, apparatus, and computer programs recorded on one or more computer storage devices, each configured to perform the actions of the methods.

In another general aspect, in an embodiment, a computer system includes a processor and memory. The processor and the memory in combination are operable to implement a method. The method includes discovering a support communication via a communication data source that provides voice and non-voice communication service, the support communication corresponding to a support request of a user. The method also includes obtaining communication text from the support communication based, at least in part, on a determination of whether the support communication is a voice communication or a non-voice communication. The method also includes automatically resolving the communication text to a support use case. The method also includes automatically selecting a support actor for the support request based, at least in part, on the support use case, where the support actor is selected from a plurality of support actors that include a plurality of support bots. The method also includes triggering handling of the support request by the selected support actor.

In another general aspect, in an embodiment, a computer-program product includes a non-transitory computer-usable medium having computer-readable program code embodied therein. The computer-readable program code is adapted to be executed to implement a method. The method includes discovering a support communication via a communication data source that provides voice and non-voice communication service, the support communication corresponding to a support request of a user. The method also includes obtaining communication text from the support communication based, at least in part, on a determination of whether the support communication is a voice communication or a non-voice communication. The method also includes automatically resolving the communication text to a support use case. The method also includes automatically selecting a support actor for the support request based, at least in part, on the support use case, where the support actor is selected from a plurality of support actors that include a plurality of support bots. The method also includes triggering handling of the support request by the selected support actor.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIG. 1 illustrates an example of a system for implementing a central management system;

DETAILED DESCRIPTION

Figure 2:
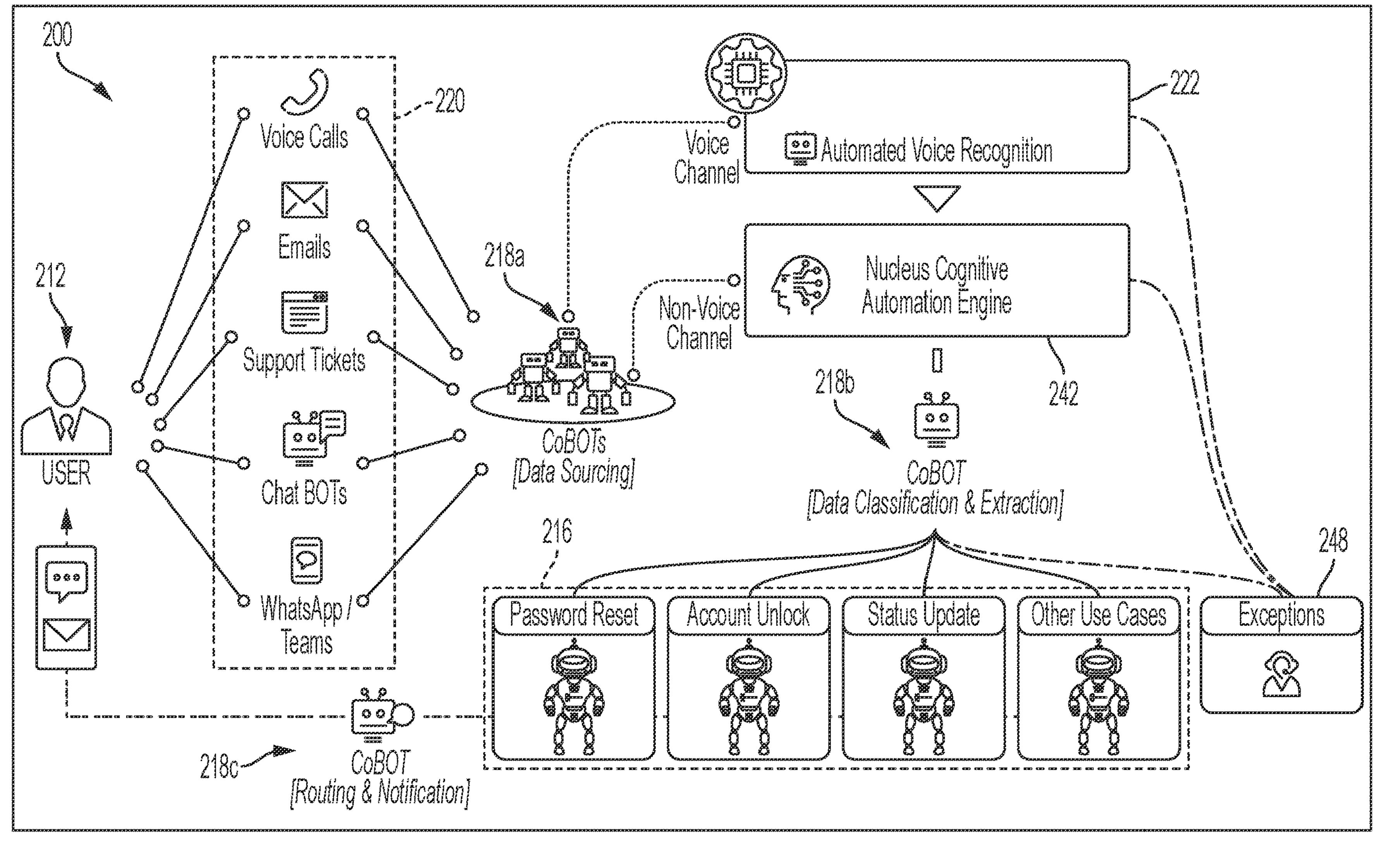
FIG. 2 illustrates an example of an environment.

Robotic process automation (RPA) is the use of software, typically in combination with artificial intelligence (AI) and machine learning capabilities, to handle high-volume sequences of repeatable tasks that previously required humans to perform. These tasks can include interacting with a user interface (UI), for example, to perform, queries, calculations, maintenance of records and transactions, web automations, remote operations, database functions, terminal connections, desktop operations, text operations, mouse simulations, keyboard simulations, folder operations, file handlers, clipboard handlers, combinations of the foregoing and/or the like. RPA technology can mimic a human worker, for example, by logging into applications, entering data, calculating and completing tasks, and logging out.

RPA technology is not always part of an organization's information technology (IT) infrastructure, but can instead, sit on top of it, enabling an organization to implement RPA technology quickly and efficiently, without changing the existing infrastructure and systems. In various embodiments, a computing environment can include, for example, many hundreds or thousands of software agents, often referred to herein as "bots," that automatically perform robotic processes. In various cases, the sequence of computer-implemented tasks performed by each bot can be the same or different, or a combination thereof. Oftentimes, the computing environment can further include, for example, many hundreds or thousands of human workers that likewise execute the same or similar computer-implemented tasks, or a combination thereof, via manual interaction with UIs. A set or sequence of computer-implemented tasks, such as the foregoing example tasks, may be referred to as a user-executed process.

For purposes of this application, the term "UI" can include, without limitation, any type of human-machine interface. Example UIs include text-based interfaces such as command-line interfaces, conversational interfaces, crossing-based interfaces, direct manipulation interfaces, gesture interfaces, graphical UIs (GUIs), hardware interfaces, holographic UIs, intelligent UIs, motion tracking interfaces, natural-language interfaces, object-oriented UIs, reflexive UIs, touchscreen interfaces, touch UIs, voice UIs, and web-based UIs. Many of the aforementioned UIs accept input via input devices such as a keyboard, mouse, microphone, combinations of the foregoing, and/or the like. A user, unless specifically stated otherwise, or otherwise understood within the context as used, can include any entity, including a human or bot, that can interact with a UI.

Although bots can provide greater efficiency via increased automation, bots introduce numerous technical problems. For example, support centers, which are sometimes referred to as contact centers or call centers, may use interactive voice response (IVR) technology to communicate with customers via voice calls. Support issues that cannot be handled via IVR are typically forwarded to human agents. The support centers may also implement chatbots to handle customer communication via text-based chats. The use of chatbots has become a primary medium of communication with customers, but such chatbots have limited capabilities. They cannot generally solve complicated issues such as password reset, account unlock and more. Such chatbots further lack effective user engagement, system and technology integrations, and intelligent decision making.

As another technical problem, customer interactions with IVR systems and/or chatbots are often abundant and, hence, technically difficult to audit. Even if every call and chat is recorded, it is not generally feasible for auditors, for example, to monitor every call and read every email, chat or support ticket. Typically, auditors randomly select a specific sample size of communications to review. This can result in the auditors missing crucial communication that might impact customer service.

As yet another technical problem, although IVR systems and chatbots, for example, occasionally may be used to provide simplistic information to customers, human agents are typically necessary to complete secure or privileged activities including activities relating, for example, to banking processes (e.g., blocking a debit or credit card upon verification and authentication), IT operations (e.g., password reset or updating address in the systems), and healthcare processes (e.g., update health information, personal information and the like). Human agents are often required to do repetitive activities including call documentation and system updates such as address update, phone number update in various systems, etc. Training a human agent on such repetitive processes is time-consuming.

The present disclosure describes examples of intelligent process automation for omnichannel user interaction. In various embodiments, a unified user experience can be provided for user support regardless of whether support is requested via, for example, a voice or non-voice communication channel. Further, in various embodiments, support bots can be specially configured for specific support use cases. In various cases, the support bots can serve as support actors for numerous complicated support use cases, with only exceptional cases being routed for handling by human support agents. In addition, in certain embodiments, numerous collaborative bots can be specially configured to automate efficient routing and handling of support requests across a multifaceted workforce that includes both the human support agents and the support bots. Examples will be described below relative to the Figures.

FIG. 1 illustrates an example of a system 100 for implementing a central management system 140 for automatically orchestrating user support. In various embodiments, the central management system 140 automatically orchestrates support provided by a multifaceted workforce that includes, for example, different types of bots and human support agents. The system 100 includes the central management system 140, tenant systems 110, RPA platforms 124, user systems 160 and one or more data stores 150, each of which is operable to communicate over a network 108. The network 108 may be, or include, one or more of a private network, a public network, a local or wide area network, a portion of the Internet, combinations of the same, and/or the like.

In some aspects, the central management system 140 can centrally manage bot deployments on the RPA platforms 124 for its tenants. The RPA platforms 124 are shown to include an RPA platform 124(1), an RPA platform 124(2) and an RPA platform 124(N). It should be appreciated that three RPA platforms are shown among the RPA platforms 124 only for illustrative purposes. In various implementations, any number of RPA platforms can be included among the RPA platforms 124. In a typical embodiment, the RPA platforms 124 each provide RPA software for creating and executing bots, generally using different RPA technology, interfaces and formats.

In particular, in the system 100, the tenant systems 110 can be served by the central management system 140. In general, the tenant systems 110 can each be considered an abstraction of users, inclusive of both bots and human workers, that execute user-executed processes managed by the central management system 140, and the systems and data sources with which those users interact. For example, one of the tenant systems 110 is shown as being owned or operated by "Tenant A" while another system 110 is shown as being owned or operated by a different tenant, "Tenant B." The tenant systems 110 shown can be owned or operated by the same or different entities. For example, Tenants A and B can represent customers (e.g., entities such as companies or individuals) of an operator of the central management system 140. Although the term "tenant" is used herein to describe the tenant systems 110 or owners/operators thereof, in addition to having its ordinary meaning, the term "tenant" can, but need not, refer to tenancy in a multitenant software architecture.

The tenant systems 110 are each shown to include one or more supported users 112, one or more human support agents 114, one or more support bots 116, one or more collaborative bots 118, one or more omnichannel engagement systems 120, one or more data sources 121 and one or more managed IT systems 122. The supported users 112 of each of the tenant systems 110 can include human users of that tenant that may periodically request support such as technical support or another service. The human support agents 114 can include one or more human users that provide user support responsive to a request. As described in greater detail below, the support bots 116 and the collaborative bots 118 can each facilitate robotic provision of user support. The support bots 116 are each configured to robotically handle a particular support use case. In general, the support bots 116 and the human support agents 114 are each available to serve as support actors in servicing requests for user support. The collaborative bots 118 are each configured to robotically handle an aspect of automatically orchestrating support requests among the support actors, including the human support agents 114 and the support bots 116.

The omnichannel engagement systems 120 can include a plurality of different communication systems and channels via which the supported users 112 can request support and/or through which the supported users 112 can interact with the human support agents 114, the support bots 116 and/or the collaborative bots 118. The omnichannel engagement systems 120 can facilitate, for example, voice communication (e.g., audio potentially in combination with video) and store recordings of the voice communication. The voice communication can be, for example, voice messages, two- or multi-way conversations between one or more of the supported users 112 and one or more of the human support agents 114, conversations between one or more of the supported users 112 and an IVR system, combinations of the foregoing and/or the like. In addition, or alternatively, the omnichannel engagement systems 120 can facilitate non-voice communication such as emails, support tickets, chat communications, chatbot communications, messaging via any suitable messaging service, combinations of the foregoing and/or the like.

The managed IT systems 122 can each provide a computing environment, inclusive of applications and corresponding UIs and dashboards, for executing technical actions responsive to requests for user support. Any given one of the managed IT systems 122 may be operated by any the support bots 116, the human support agents 114, and/or the collaborative bots 118. In some cases, the managed IT systems 122 may represent desktop virtualization environments. In such cases, the human support agents 114, for example, may operate the user systems 160 and access the desktop virtualization environments over the network 108.

The one or more data sources 121 of each of the tenant systems 110 can include data streams or datasets that can be received or processed by the managed IT systems 122, potentially as part of executing the configurable tasks. In various cases, the one or more data sources 121 can be updated by the managed IT systems 122, or other components, in real-time, on a periodic basis, e.g., according to a schedule, on-demand or a combination of the same. In various cases, the tasks for which the managed IT systems 122 are configured can be executed in the respective computing environments, for example, manually by the human support agents 114 and/or robotically by the support bots 116 and/or the collaborative bots 118. In a typical embodiment, the support bots 116 and the collaborative bots 118 are each deployed on an RPA platform of the RPA platforms 124 and interact as users in the computing environments of the managed IT systems 122 for purposes executing some or all of the configurable tasks as robotic processes.

Each bot of the support bots 116 and the collaborative bots 118 can include an instruction set 126 that can be used to provide the bot a complete set of all computer-implemented tasks or steps that are to be performed in sequence automatically, for example, as a user-executed process. In some embodiments, the instruction set 126 is in a machine-readable code that can be recognized and executed by a central processing unit. In various embodiments, the instruction set 126 can be made up of, for example, a markup language, a low-level programming language, a high-level programming language, a scripting language, a machine language, an assembly language or any combination thereof.

For example, in the case of the support bots 116, the instruction set 126 can result in the support bots 116 each being configured to execute a technical workflow in service of a support use case, where each technical workflow includes execution of one or more technical actions on a computer system, such as any of the managed IT systems 122, in service of that use case. In certain embodiments, the support bots 116 can each be configured to execute a different technical workflow in service of a different support use case. Examples of support use cases include, for example, password reset, account unlock, status update or determination, combinations of the foregoing and/or the like.

By way of further example, in the case of the collaborative bots 118, the instruction set 126 can result in the collaborative bots 118 each being configured to automate aspects of orchestrating handling of support uses by support actors, including the human support agents 114 and the support bots 116. For example, various of the collaborative bots 118 can automate monitoring, collating, and analyzing user interaction via the omnichannel engagement systems 120. This user interaction can include support communications that correspond to support requests of particular users of the supported users 112. In certain embodiments, the collaborative bots 118 can use automated AI engines to discover and understand the support communications and appropriately route the support requests to a support actor such as any of the support bots 116 or the human support agents 114. Further, in various embodiments, the collaborative bots 118 can automatically learn from audit feedback and improve over time to handle new or complex scenarios. In these embodiments, the instruction set 126 of each of the collaborative bots 118 can be automatically updated based on the learning and improvement.

In the illustrated embodiment, the central management system 140 can include a nucleus cognitive automation engine (NCAE) 142, a bot manager 145, a bot deployment module 144, a reporting module 146 and a bot creation module 143. Each of these components can be implemented with hardware and/or software, including (optionally) virtual machines and containers. In an example, the central management system 140 can be implemented as a single management server. In another example, the central management system 140 can be implemented in a plurality of virtual or physical servers, which may or may not be geographically co-located. In some embodiments, the central management system 140 and/or other aspects of the system 100 may be hosted on a cloud-provider system.

In certain embodiments, features of the components of the central management system 140 can be made accessible over an interface to the user systems 160. The user systems 160 can include any type of computing device, including desktops, laptops, tablets, and smartphones, to name a few. The user systems 160 can be operated by users, such as the human support agents 114, or by other users, for example, for administration purposes.

The NCAE 142 can implement intelligent process automation for support requests. In certain embodiments, the NCAE 142, in combination with other elements of the system 100 such as the collaborative bots 118, utilizes continuous learning, automatic recommendations, and automatic scoring and decision-making features to optimize orchestration of support requests. An example of the NCAE 142 will be described in greater detail relative to FIG. 2.

The bot creation module 143 can be utilized to create bots such as, for example, the support bots 116 and/or the collaborative bots 118. In some embodiments, an instruction set is created via the bot creation module 143 that contains all of the instructions and/or modules for a specific type of bot. The instruction set that is created can be similar to the instruction set 126 of each of the support bots 116 and the collaborative bots 118. In certain embodiments, the bot creation module 143 can utilize information from the NCAE 142 to automatically create each instruction set. In some embodiments, the bot creation module 143 includes or provides a configuration interface for manual creation of an instruction set, or for revision or tuning of an automatically created instruction set. The configuration interface can be accessible, for example, by the user systems 160.

In certain embodiments, the bot deployment module 144 can be utilized to deploy a bot on the RPA platforms 124 for a tenant, such that the deployed bot becomes one of the support bots 116 or one of the collaborative bots 118, as appropriate. In various embodiments, the bot deployment module 144 can utilize an instruction set created by the bot creation module 143 that can then be deployed. For example, the instruction set 126 of one of the support bots 116 or one of the collaborative bots 118 could be representative of a bot created by the bot creation module 143 and then deployed via the bot deployment module 144. In certain embodiments, the bot deployment module 144 can be used to deploy a single bot and/or a plurality of bots concurrently. In many cases, the bot deployment module 144 can be utilized to deploy bots on a variety of the RPA platforms 124. In some embodiments, the bot deployment module 144 can publish a configuration interface to the user systems 160, for example, for administrators, super users or other users (e.g., of a particular tenant) to select or specify such commands. In other embodiments, the bot deployment module 144 executes an automatic process to deploys bots without manual interaction. In various embodiments, the bot deployment module 144 can store command sets for some or all of the RPA platforms 124.

The bot manager 145 can serve to manage bots such as, for example, the support bots 116 and/or the collaborative bots 118, for tenants. In certain embodiments, the bot manager 145 can issue commands to control operation of bots. The bot manager 145 can be utilized to re-configure, optimize and/or customize any of the aforementioned bots. For example, various commands can start or stop bots, perform configuration management, combinations of the same and/or the like. In some cases, the bot manager 145 can publish a configuration interface to the user systems 160, for example, for administrators, super users or other users (e.g., of a particular tenant) to select or specify such commands.

The reporting module 146 can generate regular or on-demand reports related to the human support agents 114, the support bots 116 and/or the collaborative bots 118. The reporting module 146 can publish reports or other generated information, for example, to a webpage, user dashboard, and/or the like. The reporting module 146 can generate and execute a query of the one or more data stores 150, as appropriate. The web page, user dashboard or other UI(s) output, for example, by the reporting module 146, can be accessed by certain users of the user systems 160.

In general, the one or more data stores 150 can include any information collected, stored or used by the central management system 140. For example, in various embodiments, the one or more data stores 150 can include instruction sets for bots, command sets for one or more of the RPA platforms 124, deployment settings for bots (e.g., on a tenant-specific and/or bot-specific basis), metadata for bots to be deployed, data collected from the human support agents 114, the support bots 116, the collaborative bots 118 or the managed IT systems 122, combinations of the same and/or the like. In certain embodiments, data stored in the one or more data stores 150 can take the form of repositories, flat files, databases, etc. In certain embodiments, the one or more data stores 150 can be utilized as an event library, in which actions performed by any of the support bots 116, the collaborative bots 118 and/or the user systems 160 are stored. The event library can also contain business rule libraries, exception libraries, control libraries, keyboard libraries, database libraries and/or cognitive libraries.

FIG. 2 illustrates an example of an environment 200 for a system similar to the system 100 of FIG. 1. For illustrative purposes, the environment 200 includes a supported user 212 similar to the supported users 112 of FIG. 1, an omnichannel engagement systems 220 similar to the omnichannel engagement systems 120 of FIG. 1, a NCAE 242 similar to the NCAE 142 of FIG. 1, and support bots 216 similar to the support bots 116 of FIG. 1. The environment 200 further includes a first set of one or more collaborative bots **218*a*, a second set of one or more collaborative bots 218*b* and a third set of one or more collaborative bots 218*c*, the bots of which may operate as generally described relative to the collaborative bots 118 of FIG. 1. The environment 200 is also shown to include an automatic voice recognition feature 222**.

In certain embodiments, the NCAE 242 can coordinate execution of the environment 200 including, for example, triggering and/or monitoring operation of the collaborative bots **218*a*, 218*b* and 218*c* and the support bots 216. In some cases, the collaborative bots 218*a*, 218*b* and 218*c* and the support bots 216 can trigger each other as part of overall operation. As described in greater detail below, the collaborative bots 218*a*, 218*b*, and 218*c* are each shown to be configured to serve a different automation function in the environment 200, while the support bots 216** are each configured to execute a different technical workflow in service of a different use case.

In the example of FIG. 2, the supported user 212 can engage in a support communication via the omnichannel engagement systems 220, where the omnichannel engagement systems 220 collectively support voice and non-voice communication in the fashion described relative to FIG. 1, including storing the support communication. The support communication generally corresponds to a support request, such as a technical support request, of the supported user 212. In some cases, the support communication can represent an initiation, or making of, the support request.

The collaborative bots **218*a* are shown to be configured to serve a data sourcing function. In certain embodiments, the collaborative bots 218*a* are operable to discover the support communications stored by the omnichannel engagement systems 220 and to obtain communication text therefrom. In the case of voice communication, the collaborative bots 218*a* can interact with the automatic voice recognition feature 222 for purposes of obtaining the communication text. In some cases, the collaborative bots 218*a* can include the automatic voice recognition feature 222. In the case of non-voice communication, the collaborative bots 218*a*** can extract the communication text therefrom in any suitable fashion. In various embodiments, the communication text, whether it is obtained from a voice or non-voice communication, can be unstructured freeform text.

The collaborative bots 218*b* are shown to serve a data classification and extraction function. In certain embodiments, the collaborative bots 218*b* are operable to resolve the communication text obtained, for example, by the collaborative bots 218*a*, to a defined support use case via, for example, data classification. In certain embodiments, this functionality of the collaborative bots 218*b* can include extracting input data that is usable to service an applicable support use case, with different use cases potentially resulting in different input data being extracted. The input data that is extracted for each support use case can be defined in configurations stored in a data store similar to the one or more data stores 150 of FIG. 1. For example, in the case of a password reset or account unlock use case, the input data that is extracted may be a user name and an employee identifier. In the case of a status update, the input data that is extracted may be an order number, account number, or tracking number. Other examples will be apparent to one skilled in the art after a detailed review of the present disclosure.

The collaborative bots 218*b* and/or the NCAE 242 can automatically select a support actor for handing the support request based, at least in part, on the support use case to which the communication text is resolved. As described previously, the support bots 216 can, in some cases, each service a different type of support use case. In certain embodiments, speed and efficiency of operation is improved by routing support requests to one or more of the support bots 216, where practical. Therefore, in a typical embodiment, if one of the support bots 216 is configured to handle the support use case to which the communication text is resolved, that support bot can be automatically selected.

In the illustrated embodiment, exceptions 248 encompass situations in which it is determined that the support bots 216 cannot adequately handle a given support request. In a typical embodiment, the exceptions 248 are handled by human support agents such as the human support agents 114 of FIG. 1. In some embodiments, in this situation, a particular human support agent can be selected based on, for example, availability and/or skill set. In other cases, human handling can be generically indicated, for example, by adding the given support request to a queue for handling according to out-of-band workforce protocols.

Numerous situations may result in a given support request being treated as one of the exceptions 248. In an example, an exception may be determined if the automatic voice recognition feature 222 is unable to obtain communication text from a voice communication within quality standards. In another example, an exception may be determined if the NCAE 242 and/or the collaborative bots 218*b* are unable to resolve communication text from a support communication to any particular support use case within quality standards. In yet another example, an exception may be determined after initial selection of one of the support bots 216 if, for example, an error occurs during operation of a given technical workflow (e.g., cannot reset password, unlock account, or retrieve a status update). Other examples of the exceptions 248 will be apparent to one skilled in the art after a detailed review of the present disclosure.

The collaborative bots 218*c* are shown to serve a routing and notification function. The routing and notification function of the collaborative bots 218*c* can include, for example, notifying the supported user 212, potentially via the omnichannel engagement systems 120, regarding technical actions taken by one or more of the support bots 216 in service of a given support request. An example of overall operation in the environment 200 will be described relative to FIG. 3. Example operation of the collaborative bots 218*a* and the collaborative bots 218*b* will be described relative to FIGS. 4 and 5, respectively. Example operation of the support bots 216 will be described relative to FIG. 6.

Figure 3:
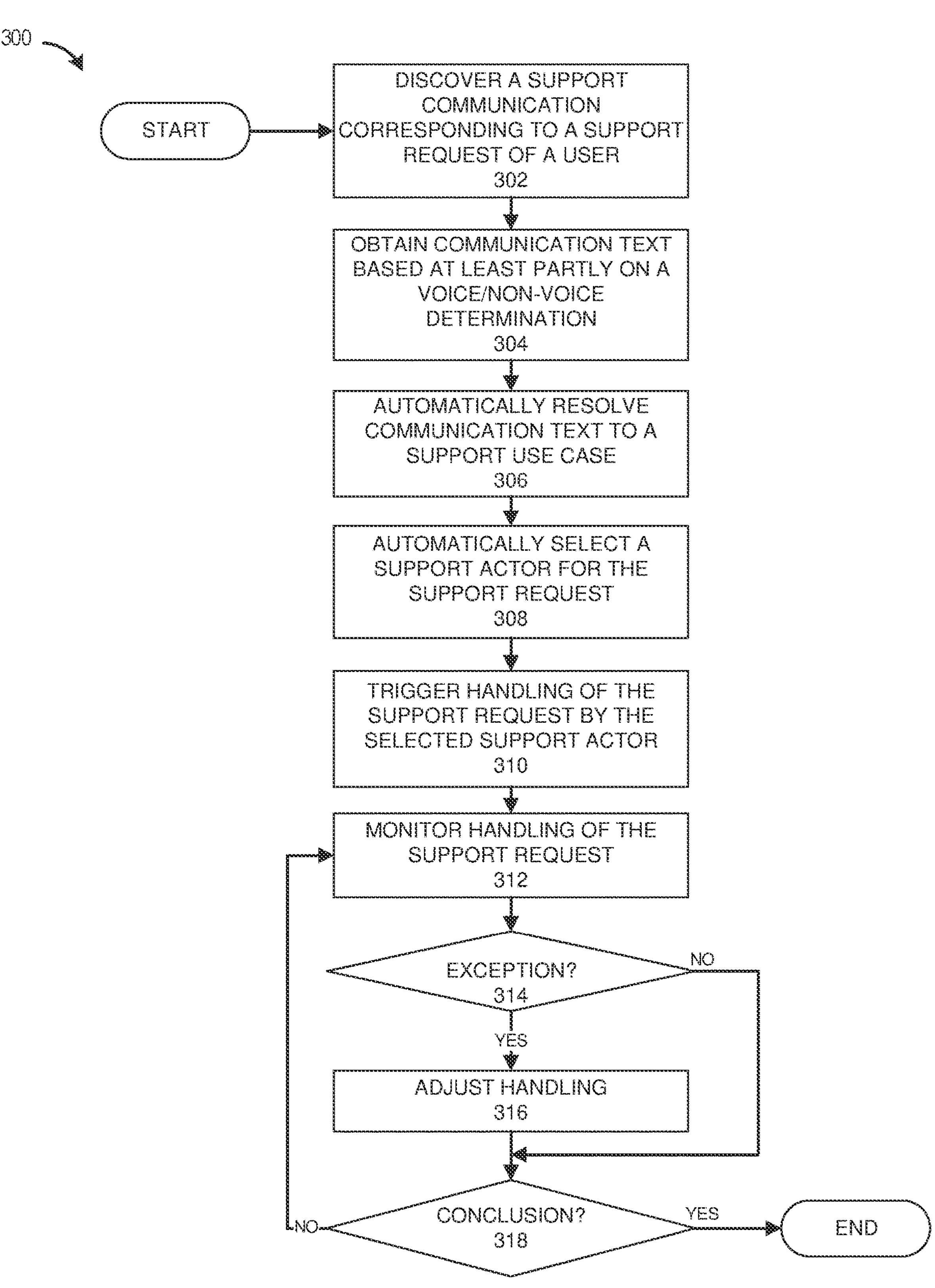
FIG. 3 illustrates an example of a process for intelligent process automation.

FIG. 3 illustrates an example of a process 300 for intelligent process automation for omnichannel user interaction. In certain embodiments, the process 300 can be implemented by any system that can process data. Although any number of systems, in whole or in part, can implement the process 300, to simplify discussion, the process 300 will be described in relation to particular components shown and described relative to FIGS. 1 and 2.

In various embodiments, blocks 302 and 304 can be performed by one or more of the collaborative bots 218*a*, which bots may be configured for data sourcing as described previously. In some embodiments, the NCAE 242 can trigger operation of the collaborative bots 218*a*. At block 302, the collaborative bots 218*a*, or a selected bot thereof, discovers a support communication via the omnichannel engagement systems 220. In general, the support communication corresponds to a support request of a user, such as a request for technical support. In various embodiments, the collaborative bots 218*a* can retrieve the support communication from a designated storage location for such communications such as, for example, one of the one or more data sources 121 of FIG. 1, in a rule-based fashion. Voice communications may be stored in any suitable format (e.g., .mp3, .wav, etc.).

At block 304, the collaborative bots 218*a*, or a selected bot thereof, obtains communication text from the support communication based, at least in part, on a determination of whether the support communication is a voice communication or a non-voice communication. In general, obtaining text from a voice communication can involve the automatic voice recognition feature 222 described previously. Example functionality that can be performed at the block 304 will be described with respect to FIG. 4.

In various embodiments, blocks 306, 308, 310 and 312 can performed, for example, by the NCAE 242 and/or a particular one of the collaborative bots 218*b*, which bot may be configured to perform data classification and extraction as described previously. In some embodiments, the NCAE 242 can trigger operation of the particular one of the collaborative bots 218*b*. At block 306, the NCAE 242 and/or one of the collaborative bots 218*b* automatically resolves the communication text obtained at the block 302 to a support use case. The automatic resolution can include, for example, extracting input data for the support request according to stored configurations for the support use case. Example functionality that can be performed at the block 306 will be described with respect to FIG. 5.

At block 308, the NCAE 242 and/or one of the collaborative bots 218*b* automatically selects a support actor for handling the support request. As described previously, the selected support actor can be, for example, one of the support bots 216, a human support agent such as one of the human support agents 114, or the like. In general, the support actor can be selected in any of the ways described above relative to FIG. 2, with the exceptions 248 being routed for human handling as previously discussed. At block 310, the NCAE 242 and/or one of the collaborative bots 218*b* triggers handling of the support request by the selected support actor. The triggering can include, for example, routing information related to the extracted input data, if any, to the selected support actor.

At block 312, the NCAE 242 and/or one of the collaborative bots 218*b* monitors handling of the support request by the selected support actor. For example, in a typical embodiment, if the selected support actor is one of the support bots 216, the NCAE 242 and/or one of the collaborative bots 218*b* can monitor for errors or other situations that may be treated as one of the exceptions 248 as described previously.

At decision block 314, the NCAE 242 and/or one of the collaborative bots 218*b* determines whether an exception has been detected in operation of the selected support actor. If not, the process 300 proceeds directly to decision block 318. Otherwise, if it is determined at the decision block 314 that an exception has been detected, at block 316, the NCAE 242 and/or one of the collaborative bots 218*b* adjusts handling the support request in response to the exception. For example, if the selected support actor is one of the support bots 216, the NCAE 242 and/or one of the collaborative bots 218*b* can trigger handling by the support request by a human support agent such as one of the human support agents 114 of FIG. 1. From block 316, the process 300 proceeds to decision block 318.

At decision block 318, the NCAE 242 and/or one of the collaborative bots 218*b* determines whether the process 300 should be concluded, for example, as a result of a resolution of the support request corresponding to the support communication discovered at the block 302. If not, the process 300 returns to the block 312 and executes as described previously. Otherwise, if it is determined at the decision block 318 that the process 300 should be concluded, the process 300 ends.

Figure 4:
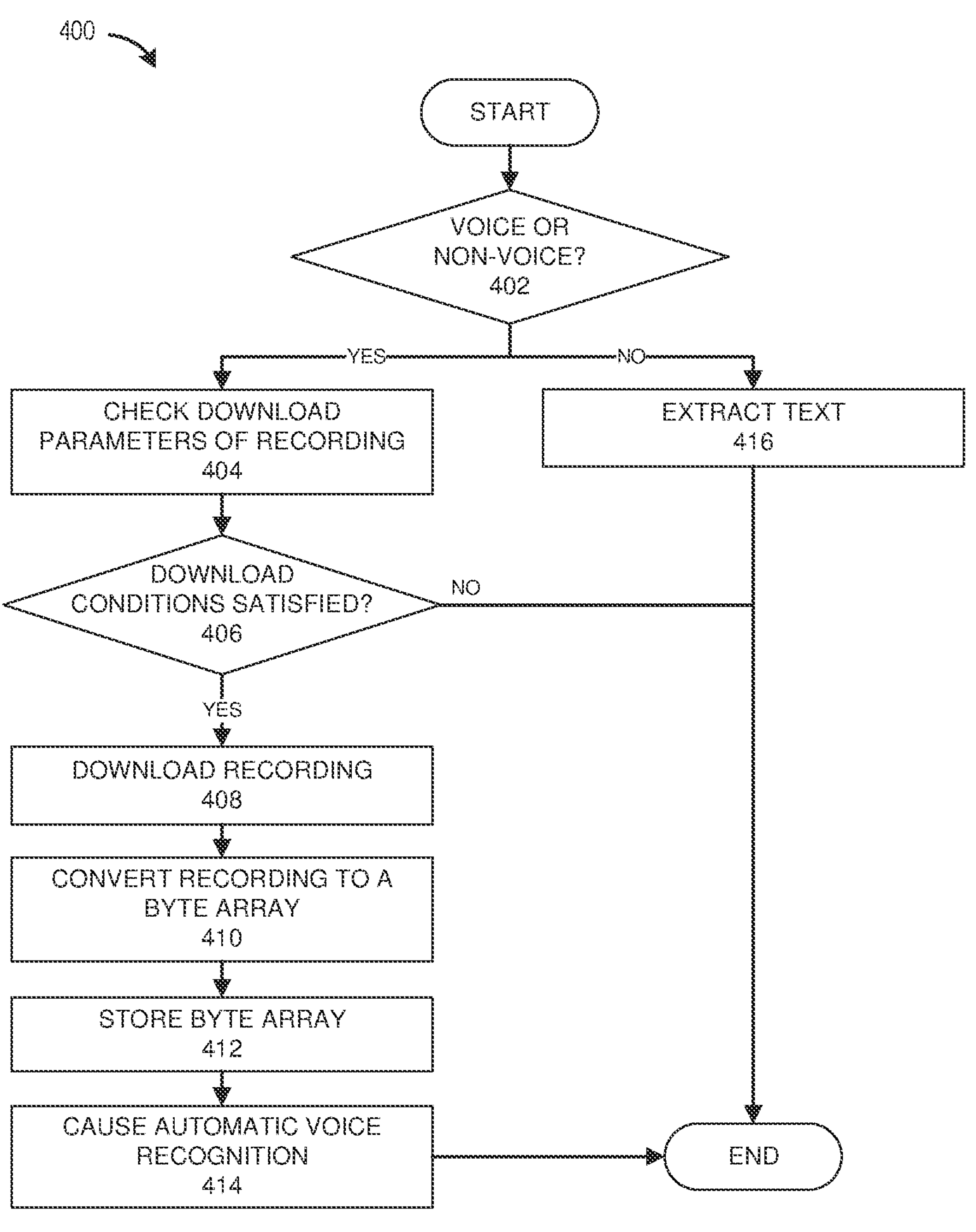
FIG. 4 illustrates an example of a process for obtaining communication text from a support communication.

FIG. 4 illustrates an example of a process 400 for obtaining communication text from a support communication. In various embodiments, the process 400 can be performed as all or part of the block 304 of the process 300 of FIG. 3. In certain embodiments, the process 400 can be implemented by any system that can process data. Although any number of systems, in whole or in part, can implement the process 400, to simplify discussion, the process 400 will be described in relation to a particular collaborative bot of the collaborative bots 218*a*, which bots are configured for data sourcing as described previously.

At decision block 402, the particular collaborative bot determines whether the support communication is a voice communication or a non-voice communication. If it is determined at the decision block 402 that the support communication is a non-voice communication, the process 400 proceeds to block 416. At block 416, the particular collaborative bot extracts the communication text from the non-voice communication. After block 416, the process 400 ends.

If it is determined at the decision block 402 that the support communication is a voice communication, the process 400 proceeds to block 404. At block 404, the particular collaborative bot checks download parameters of an audio recording that includes the voice communication. For example, the particular collaborative bot can check a file size, communication duration, file type and/or the like. At decision block 406, the particular collaborative bot determines whether the download parameters satisfy one or more download conditions relating, for example, to an expected file type, minimum communication duration, maximum communication duration, minimum file size, maximum file size, an expected relationship between file size and communication duration, combinations of the foregoing and/or the like. If it is determined at the decision block 406 that the one or more download conditions are not satisfied, the process 400 can end.

If it is determined at the decision block 406 that the one or more download conditions are satisfied, the process 400 proceeds to block 408. At block 408, the particular collaborative bot downloads the recording. At block 410, the particular collaborative bot converts the recording to a byte array. At block 412, the particular collaborative stores the byte array, for example, in the one or more data stores 150 of FIG. 1. At block 414, the particular collaborative bot causes automatic voice recognition of the byte array via, for example, the automatic voice recognition feature 222 of FIG. 2. In a typical embodiment, the automatic voice recognition yields the communication text. After block 414, the process 400 ends.

Figure 5:
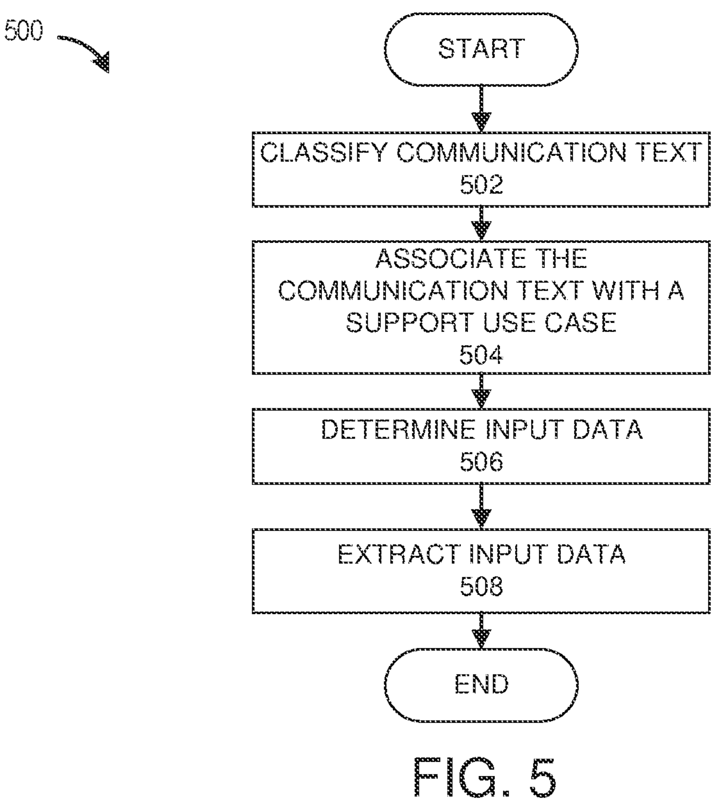
FIG. 5 illustrates an example of a process for automatically resolving communication text to a support use case.

FIG. 5 illustrates an example of a process 500 for automatically resolving communication text to a support use case. In various embodiments, the process 500 can be performed as all or part of the block 306 of the process 300 of FIG. 3. In certain embodiments, the process 500 can be implemented by any system that can process data. Although any number of systems, in whole or in part, can implement the process 500, to simplify discussion, the process 500 will be described in relation to a particular collaborative bot of the collaborative bots 218*b*, which bots are configured for data classification and extraction as described previously.

At block 502, the particular collaborative bot classifies the communication text according to a plurality of support use cases, with the block 502 matching the communication text to an identified support use case, or otherwise yielding an identified support use case. In some embodiments, classification can be performed via a supervised machine learning algorithm that predicts a support use case based on the communication text. In these embodiments, the predicted support use case can be a categorical or discrete value corresponding to a particular support use case in a set of support use cases. In addition, or alternatively, various embodiments can utilize at least one of the classification types such as binary classification, multi-class classification and multi-label classification. In addition, or alternatively, various embodiments can use imbalanced classification, which classification includes techniques such as classification logistic regression, stochastic gradient descent, k-nearest neighbors, decision trees, random forest, artificial neural network, support vector machine and naive bayes.

At block 504, the particular collaborative bot associates the identified support use case with the support request corresponding to the communication text (e.g., the support request corresponding to an original support communication discovered at the block 302 of FIG. 3). At block 506, the particular collaborative bot determines input data for the support request based, at least in part, on configurations for the support use case as previously described with respect to FIG. 2. At block 508, the particular collaborative bot extracts the input data from one or more data sources as previously described with respect to FIG. 2. After block 508, the process 500 ends.

Figure 6:
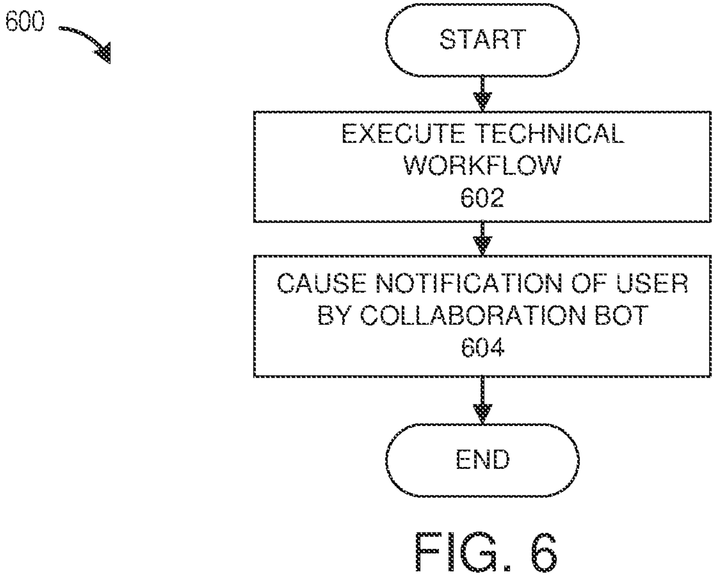
FIG. 6 illustrates an example of a process for execution of a support bot.

FIG. 6 illustrates an example of a process 600 for execution of a support bot. Although any number of systems, in whole or in part, can implement the process 600, to simplify discussion, the process 600 will be described in relation to a particular support bot of the support bots 216 of FIG. 2.

At block 602, the particular support bot executes a technical work flow in service of the support use for which it is configured. In various embodiments, the execution can include taking one or more technical actions on a computer system such as one of the managed IT systems 122 of FIG. 1. At block 604, the particular support bot triggers one of the collaborative bots 218*c* to notify a user (e.g., the user that originated a support request relative to the block 302 of FIG. 3) regarding the taking of the one or more technical actions. For example, the triggering can result in the triggered collaborative bot of the collaborative bots 218*c* notifying the user that a password has been reset, an account has been unlocked, or the like. The notification can occur via, for example, the omnichannel engagement systems 120 of FIG. 1 and/or the omnichannel engagement systems 220 of FIG. 2. After block 604, the process 600 ends.

Figure 7:
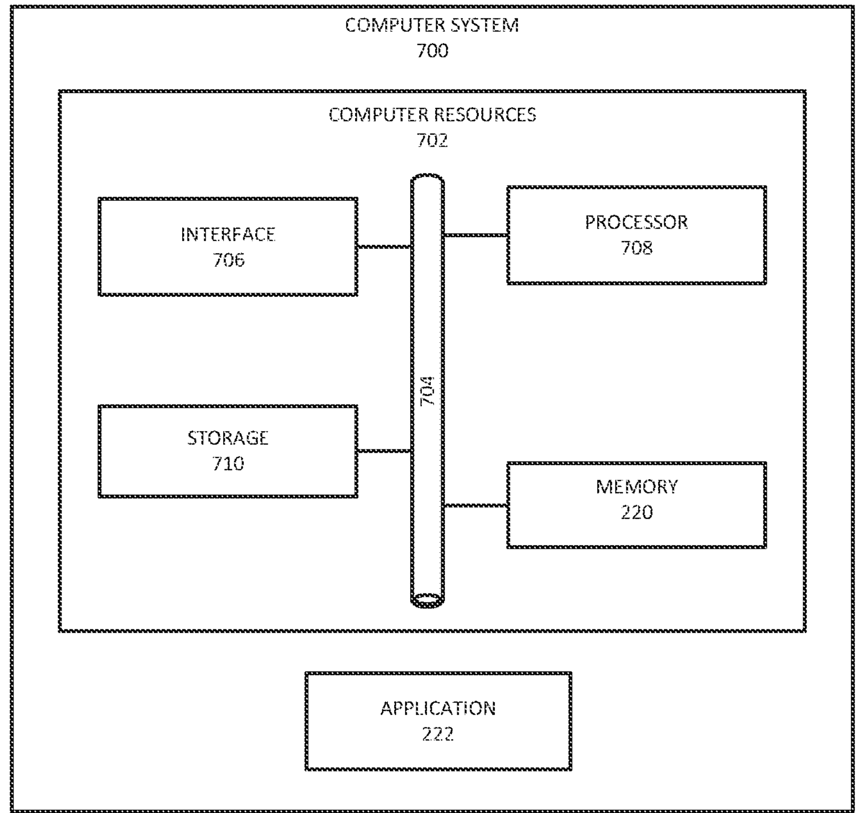
FIG. 7 illustrates an example of a computer system.

FIG. 7 illustrates an example of a computer system 700 that, in some cases, can be representative, for example, of the central management system 140, the RPA platforms 124, the tenant systems 110, the user systems 160 and/or a module or sub-component of the foregoing. The computer system 700 includes an application 722 operable to execute on computer resources 702. The application 722 can be, for example, any of the systems or modules illustrated in FIG. 1 or FIG. 2. In particular embodiments, the computer system 700 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 700 may comprise any suitable physical form, configuration, number, type and/or layout. As an example, and not by way of limitation, the computer system 700 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 700 may include one or more computer systems; be unitary or distributed; span multiple locations; span multiple machines; or reside in a cloud, which may include one or more cloud components in one or more networks.

In the depicted embodiment, the computer system 700 includes a processor 708, memory 720, storage 710, interface 706, and bus 704. Although a particular computer system is depicted having a particular number of particular components in a particular arrangement, this disclosure contemplates any suitable computer system having any suitable number of any suitable components in any suitable arrangement.

Processor 708 may be a microprocessor, controller, or any other suitable computing device, resource, or combination of hardware, software and/or encoded logic operable to execute, either alone or in conjunction with other components, (e.g., memory 720), the application 722. Such functionality may include providing various features discussed herein. In particular embodiments, processor 708 may include hardware for executing instructions, such as those making up the application 722. As an example, and not by way of limitation, to execute instructions, processor 708 may retrieve (or fetch) instructions from an internal register, an internal cache, memory 720, or storage 710; decode and execute them; and then write one or more results to an internal register, an internal cache, memory 720, or storage 710.

In particular embodiments, processor 708 may include one or more internal caches for data, instructions, or addresses. This disclosure contemplates processor 708 including any suitable number of any suitable internal caches, where appropriate. As an example, and not by way of limitation, processor 708 may include one or more instruction caches, one or more data caches, and one or more translation lookaside buffers (TLBs). Instructions in the instruction caches may be copies of instructions in memory 720 or storage 710 and the instruction caches may speed up retrieval of those instructions by processor 708. Data in the data caches may be copies of data in memory 720 or storage 710 for instructions executing at processor 708 to operate on; the results of previous instructions executed at processor 708 for access by subsequent instructions executing at processor 708, or for writing to memory 720, or storage 710, or other suitable data. The data caches may speed up read or write operations by processor 708. The TLBs may speed up virtual-address translations for processor 708. In particular embodiments, processor 708 may include one or more internal registers for data, instructions, or addresses. Depending on the embodiment, processor 708 may include any suitable number of any suitable internal registers, where appropriate. Where appropriate, processor 708 may include one or more arithmetic logic units (ALUs); be a multi-core processor; include one or more processors 708; or any other suitable processor.

Memory 720 may be any form of volatile or non-volatile memory including, without limitation, magnetic media, optical media, random access memory (RAM), read-only memory (ROM), flash memory, removable media, or any other suitable local or remote memory component or components. In particular embodiments, memory 720 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 720 may include one or more memories 720, where appropriate. Memory 720 may store any suitable data or information utilized by the computer system 700, including software embedded in a computer readable medium, and/or encoded logic incorporated in hardware or otherwise stored (e.g., firmware). In particular embodiments, memory 720 may include main memory for storing instructions for processor 708 to execute or data for processor 708 to operate on. In particular embodiments, one or more memory management units (MMUs) may reside between processor 708 and memory 720 and facilitate accesses to memory 720 requested by processor 708.

As an example, and not by way of limitation, the computer system 700 may load instructions from storage 710 or another source (such as, for example, another computer system) to memory 720. Processor 708 may then load the instructions from memory 720 to an internal register or internal cache. To execute the instructions, processor 708 may retrieve the instructions from the internal register or internal cache and decode them. During or after execution of the instructions, processor 708 may write one or more results (which may be intermediate or final results) to the internal register or internal cache. Processor 708 may then write one or more of those results to memory 720. In particular embodiments, processor 708 may execute only instructions in one or more internal registers or internal caches or in memory 720 (as opposed to storage 710 or elsewhere) and may operate only on data in one or more internal registers or internal caches or in memory 720 (as opposed to storage 710 or elsewhere).

In particular embodiments, storage 710 may include mass storage for data or instructions. As an example, and not by way of limitation, storage 710 may include a hard disk drive (HDD), a floppy disk drive, flash memory, an optical disc, a magneto-optical disc, magnetic tape, or a Universal Serial Bus (USB) drive or a combination of two or more of these. Storage 710 may include removable or non-removable (or fixed) media, where appropriate. Storage 710 may be internal or external to the computer system 700, where appropriate. In particular embodiments, storage 710 may be non-volatile, solid-state memory. In particular embodiments, storage 710 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 710 may take any suitable physical form and may comprise any suitable number or type of storage. Storage 710 may include one or more storage control units facilitating communication between processor 708 and storage 710, where appropriate.

In particular embodiments, interface 706 may include hardware, encoded software, or both providing one or more interfaces for communication (such as, for example, packet-based communication) among any networks, any network devices, and/or any other computer systems. As an example, and not by way of limitation, communication interface 706 may include a network interface controller (NIC) or network adapter for communicating with an Ethernet or other wire-based network and/or a wireless NIC (WNIC) or wireless adapter for communicating with a wireless network.

Depending on the embodiment, interface 706 may be any type of interface suitable for any type of network for which computer system 700 is used. As an example, and not by way of limitation, computer system 700 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 700 may include any suitable interface 706 for any one or more of these networks, where appropriate.

In some embodiments, interface 706 may include one or more interfaces for one or more I/O devices. One or more of these I/O devices may enable communication between a person and the computer system 700. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 706 for them. Where appropriate, interface 706 may include one or more drivers enabling processor 708 to drive one or more of these I/O devices. Interface 706 may include one or more interfaces 706, where appropriate.

Bus 704 may include any combination of hardware, software embedded in a computer readable medium, and/or encoded logic incorporated in hardware or otherwise stored (e.g., firmware) to couple components of the computer system 700 to each other. As an example, and not by way of limitation, bus 704 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 704 may include any number, type, and/or configuration of buses 704, where appropriate. In particular embodiments, one or more buses 704 (which may each include an address bus and a data bus) may couple processor 708 to memory 720. Bus 704 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 708 (such as, for example, one or more internal registers or caches), one or more portions of memory 720, one or more portions of storage 710, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of intelligent robotic process automation in a computing environment for omnichannel user interaction, the method comprising providing a unified user experience for user support over a plurality of communication channels via a plurality of collaborative bots and a plurality of support bots in the computing environment, the plurality of communication channels comprising a voice communication channel and a non-voice communication channel, the providing comprising:

triggering a first collaborative bot of the plurality of collaborative bots, wherein the first collaborative bot robotically executes, as a first user in the computing environment, a first user-executed process for data sourcing via both the voice communication channel and the non-voice communication channel;

discovering, by the first collaborative bot, a support communication via at least one of the voice communication channel or the non-voice communication channel, the support communication corresponding to a support request of a user, wherein discovering comprises retrieving the support communication from a designated storage location in which an omnichannel engagement system stores support communications;

obtaining, by the first collaborative bot, communication text from the support communication via a method that is based, at least in part, on a determination of whether the support communication is a voice communication or a non-voice communication, wherein the obtaining communication text comprises, responsive to a determination that the support communication is a voice communication: checking, by the first collaborative bot, download parameters of a recording comprising the voice communication, responsive to a determination that the download parameters satisfy one or more download conditions, downloading, by the first collaborative bot, the recording, converting, by the first collaborative bot, the recording to a byte array, storing, by the first collaborative bot, the byte array, and causing automatic voice recognition of the byte array;

responsive to the obtaining the communication text, triggering, by the first collaborative bot, a second collaborative bot of the plurality of collaborative bots, wherein the second collaborative bot robotically executes, as a second user in the computing environment, a second user-executed process for data classification;

automatically resolving, by the second collaborative bot, the communication text to a support use case of a plurality of defined support use cases via data classification of the communication text, wherein automatically resolving comprises extracting input data for the support request based, at least in part, on configurations for the support use case;

automatically selecting, by the second collaborative bot, a support bot for the support request based, at least in part, on the support use case, wherein the support bot is selected from a plurality of support bots that are each configured to robotically execute, without user interaction, a different technical workflow in service of a different support use case of the plurality of defined support use cases; and responsive to the automatically selecting, triggering handling, by the second collaborative bot, of the support request by the automatically selected support bot, wherein triggering handling comprises routing information related to the extracted input data to the automatically selected support bot;

robotically executing, by the automatically selected support bot, the corresponding technical workflow without interaction with the user; and responsive to the robotically executing, notifying, by at least one of the collaborative bots, the user regarding the handling the support request via at least one of the voice communication channel or the non-voice communication channel.

2. The method of claim 1, wherein the notifying is performed by a third collaborative bot of the plurality of collaborative bots, the third collaborative bot robotically executing, as a third user in the computing environment, a third user-executed process for routing and notification.

3. The method of claim 1, wherein the obtaining communication text comprises, responsive to a determination that the support communication is a voice communication, causing automatic voice recognition of the voice communication, wherein the automatic voice recognition yields at least a portion of the communication text.

4. The method of claim 1, wherein the obtaining communication text comprises, responsive to a determination that the support communication is a non-voice communication, extracting at least a portion of the communication text from the non-voice communication.

5. The method of claim 1, wherein:

the automatically selected support bot is configured to handle the support use case to which the communication text is resolved.

6. The method of claim 1, wherein the executing comprises taking, by the automatically selected support bot, one or more technical actions on a computer system in service of the support request of the user.

7. The method of claim 6, wherein the one or more technical actions are selected from the group consisting of: password reset, account unlock, and status determination.

8. The method of claim 6, comprising the automatically selected support bot triggering the at least one of the collaborative bots to notify the user regarding the taking of the one or more technical actions.

9. The method of claim 1, comprising:

detecting an exception in operation of the automatically selected support bot; and responsive to the exception, triggering handling of the support request by a human support agent.

10. The method of claim 1, comprising:

determining input data for the support request based, at least in part, on configurations for the support use case;

extracting the input data from one or more data sources; and wherein the triggering handling comprises routing information related to the input data to the automatically selected support bot.

11. The method of claim 1, wherein the automatically resolving comprises:

classifying the communication text according to a plurality of support use cases; and associating the support use case with the support request based, at least in part, on a result of the classifying.

12. The method of claim 1, further comprising:

discovering a second support communication via at least one of the voice communication channel or the non-voice communication channel, the second support communication corresponding to a second support request of a second user;

obtaining second communication text from the second support communication based, at least in part, on a determination of whether the second support communication is a voice communication or a non-voice communication; and responsive to a determination that the second support request does not correspond to any support use case that the plurality of support bots are configured to handle, automatically selecting a human support agent for the support request.

13. The method of claim 1, wherein the communication text is unstructured.

14. A computer system comprising a processor and memory, wherein the processor and the memory in combination are operable to implement a method of intelligent robotic process automation in a computing environment for omnichannel user interaction, the method comprising providing a unified user experience for user support over a plurality of communication channels via a plurality of collaborative bots and a plurality of support bots in the computing environment, the plurality of communication channels comprising a voice communication channel and a non-voice communication channel, the providing comprising:

triggering a first collaborative bot of the plurality of collaborative bots, wherein the first collaborative bot robotically executes, as a first user in the computing environment, a first user-executed process for data sourcing via both the voice communication channel and the non-voice communication channel;

discovering, by the first collaborative bot, a support communication via at least one of the voice communication channel or the non-voice communication channel, the support communication corresponding to a support request of a user, wherein discovering comprises retrieving the support communication from a designated storage location in which an omnichannel engagement system stores support communications;

obtaining, by the first collaborative bot, communication text from the support communication via a method that is based, at least in part, on a determination of whether the support communication is a voice communication or a non-voice communication, wherein the obtaining communication text comprises, responsive to a determination that the support communication is a voice communication: checking, by the first collaborative bot, download parameters of a recording comprising the voice communication, responsive to a determination that the download parameters satisfy one or more download conditions, downloading, by the first collaborative bot, the recording, converting, by the first collaborative bot, the recording to a byte array, storing, by the first collaborative bot, the byte array, and causing automatic voice recognition of the byte array;

responsive to the obtaining the communication text, triggering, by the first collaborative bot, a second collaborative bot of the plurality of collaborative bots, wherein the second collaborative bot robotically executes, as a second user in the computing environment, a second user-executed process for data classification;

automatically resolving, by the second collaborative bot, the communication text to a support use case of a plurality of defined support use cases via data classification of the communication text, wherein automatically resolving comprises extracting input data for the support request based, at least in part, on configurations for the support use case;

automatically selecting, by the second collaborative bot, a support bot for the support request based, at least in part, on the support use case, wherein the support bot is selected from a plurality of support bots that are each configured to robotically execute, without user interaction, a different technical workflow in service of a different support use case of the plurality of defined support use cases; and responsive to the automatically selecting, triggering handling, by the second collaborative bot, of the support request by the automatically selected support bot, wherein triggering handling comprises routing information related to the extracted input data to the automatically selected support bot;

robotically executing, by the automatically selected support bot, the corresponding technical workflow without interaction with the user; and responsive to the robotically executing, notifying, by at least one of the collaborative bots, the user regarding the handling the support request via at least one of the voice communication channel or the non-voice communication channel.

15. A computer-program product comprising a non-transitory computer-usable medium having computer-readable program code embodied therein, the computer-readable program code adapted to be executed to implement a method of intelligent robotic process automation in a computing environment for omnichannel user interaction, the method comprising providing a unified user experience for user support over a plurality of communication channels via a plurality of collaborative bots and a plurality of support bots in the computing environment, the plurality of communication channels comprising a voice communication channel and a non-voice communication channel, the providing comprising:

triggering a first collaborative bot of the plurality of collaborative bots, wherein the first collaborative bot robotically executes, as a first user in the computing environment, a first user-executed process for data sourcing via both the voice communication channel and the non-voice communication channel;

discovering, by the first collaborative bot, a support communication via at least one of the voice communication channel or the non-voice communication channel, the support communication corresponding to a support request of a user, wherein discovering comprises retrieving the support communication from a designated storage location in which an omnichannel engagement system stores support communications;

obtaining, by the first collaborative bot, communication text from the support communication via a method that is based, at least in part, on a determination of whether the support communication is a voice communication or a non-voice communication, wherein the obtaining communication text comprises, responsive to a determination that the support communication is a voice communication: checking, by the first collaborative bot, download parameters of a recording comprising the voice communication, responsive to a determination that the download parameters satisfy one or more download conditions, downloading, by the first collaborative bot, the recording, converting, by the first collaborative bot, the recording to a byte array, storing, by the first collaborative bot, the byte array, and causing automatic voice recognition of the byte array;

responsive to the obtaining the communication text, triggering, by the first collaborative bot, a second collaborative bot of the plurality of collaborative bots, wherein the second collaborative bot robotically executes, as a second user in the computing environment, a second user-executed process for data classification;

automatically resolving, by the second collaborative bot, the communication text to a support use case of a plurality of defined support use cases via data classification of the communication text, wherein automatically resolving comprises extracting input data for the support request based, at least in part, on configurations for the support use case;

automatically selecting, by the second collaborative bot, a support bot for the support request based, at least in part, on the support use case, wherein the support bot is selected from a plurality of support bots that are each configured to robotically execute, without user interaction, a different technical workflow in service of a different support use case of the plurality of defined support use cases; and responsive to the automatically selecting, triggering handling, by the second collaborative bot, of the support request by the automatically selected support bot, wherein triggering handling comprises routing information related to the extracted input data to the automatically selected support bot;

robotically executing, by the automatically selected support bot, the corresponding technical workflow without interaction with the user; and responsive to the robotically executing, notifying, by at least one of the collaborative bots, the user regarding the handling the support request via at least one of the voice communication channel or the non-voice communication channel.

16. The computer-program product of claim 15, wherein the notifying is performed by a third collaborative bot of the plurality of collaborative bots, the third collaborative bot robotically executing, as a third user in the computing environment, a third user-executed process for routing and notification.

17. The computer-program product of claim 15, wherein the obtaining communication text comprises, responsive to a determination that the support communication is a voice communication, causing automatic voice recognition of the voice communication, wherein the automatic voice recognition yields at least a portion of the communication text.

18. The computer-program product of claim 15, wherein the obtaining communication text comprises, responsive to a determination that the support communication is a non-voice communication, extracting at least a portion of the communication text from the non-voice communication.

* * * * *